United States Patent
Dhanaraj et al.

(10) Patent No.: US 10,853,227 B2
(45) Date of Patent: Dec. 1, 2020

(54) SYSTEMS AND METHODS FOR MODULAR TEST PLATFORM FOR APPLICATIONS

(71) Applicant: Verizon Patent and Licensing Inc., Arlington, VA (US)

(72) Inventors: Murali Dhanaraj, Easton, PA (US); Saurabh Mittal, Bridgewater, NJ (US); Calvin Eric, Hillside, NJ (US); Gaurav Rishi, Monmouth Junction, NJ (US); Ali Asghar Nasser, Monmouth JCT, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 185 days.

(21) Appl. No.: 16/042,422

(22) Filed: Jul. 23, 2018

(65) Prior Publication Data

US 2020/0026640 A1 Jan. 23, 2020

(51) Int. Cl.
*G06F 11/00* (2006.01)
*G06F 11/36* (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
CPC .............. G06F 11/3664; G06F 11/3684; G06F 11/3688; G06F 11/3692; G06F 11/3612; G06F 11/362; G06F 11/3644; G06F 11/3672
See application file for complete search history.

(56) References Cited

U.S. PATENT DOCUMENTS

| | | | | |
|---|---|---|---|---|
| 2006/0253742 A1* | 11/2006 | Elenburg | ............ | G06F 11/3414 714/38.14 |
| 2007/0016829 A1* | 1/2007 | Subramanian | ...... | G06F 11/3684 714/38.1 |
| 2013/0060507 A1* | 3/2013 | Kianovski | ........... | G06F 11/3684 702/123 |
| 2013/0198567 A1* | 8/2013 | Ahmed | ............... | G06F 11/3684 714/32 |
| 2016/0196021 A1* | 7/2016 | Rahulkrishna | ...... | G06F 11/3688 715/760 |
| 2018/0173606 A1* | 6/2018 | Malla | .................... | G06F 11/368 |

\* cited by examiner

*Primary Examiner* — Joseph D Manoskey

(57) ABSTRACT

A test platform provides modular test automation. The modular test automation may include defining modular segments of a test configuration, and testing an Application Under Test ("AUT") based on the modular segments. The test configuration may define a specific flow or execution ordering for the modular segments. The flow may be changed by reordering the segments, modularly adding new segments anywhere in the flow, removing segments, modifying individual segments without affecting other segments, defining a particular segment once and reusing the particular segment in two or more different test configurations, and/or carrying over a change made to the particular segment in a first test configuration to the particular segment of a second test configuration automatically. The modular test automation may also include modularly selecting a set of nodes for testing the AUT according to the modular segments of the flow.

20 Claims, 10 Drawing Sheets

SYSTEMS AND METHODS FOR MODULAR TEST PLATFORM FOR APPLICATIONS

BACKGROUND

Testing using different environments, usage scenarios, loads, and/or other variable conditions must be done to ensure proper operation of software and/or hardware of an Application Under Test ("AUT").

DETAILED DESCRIPTION OF PREFERRED EMBODIMENTS

The following detailed description refers to the accompanying drawings. The same reference numbers in different drawings may identify the same or similar elements.

Systems and/or methods, as described herein, provide modular test automation, via a modular test automation platform, for testing functionalities, services, websites, pages, content, Application Programming Interfaces ("APIs"), hardware, and/or other software of an Application Under Test ("AUT"). The modular test automation may include defining and executing modular segments according to a specified flow, and/or modularly selecting the nodes for testing the AUT according to the modular segments of the flow.

A test configuration may define a specific flow or arrangement for one or more segments. The modular test automation may permit rearranging of the flow by reordering the segments, modularly adding new segments anywhere in the flow, removing segments, modifying individual segments without affecting other segments, defining a particular segment once and reusing the particular segment in two or more different test configurations, and/or carrying over a change made to the particular segment in a first test configuration to the particular segment of a second test configuration automatically.

Each segment may include one or more actions. Each action may test one or more elements of an AUT. For instance, each action may provide input, modify, invoke a command or function, or otherwise interact with one or more elements of the AUT. To simplify the test configuration definition, each action may be associated with (i) identifiers that reference the one or more elements of the AUT, (ii) code for interacting (e.g., providing input, modifying, invoking a command or function, etc.) with the one or more elements, and/or (iii) code for obtaining or verifying output from the one or more elements.

The modular test automation simplifies AUT testing by allowing test configurations to be constructed without the manual writing of computer code, and also the direct linking between the computer code and the AUT as it exists in a particular point in time. With a test case defined using computer code, any change to the AUT may break one or more of the links, and may cause the test case to fail. Each change to the AUT may therefore necessitate manual debugging and changing of the computer code, and/or recording the test case anew using a test automation tool. However, with the modular test automation platform described herein, each segment and its corresponding actions may be changed independently of other segments without impacting the overall test configuration.

Figure 1:
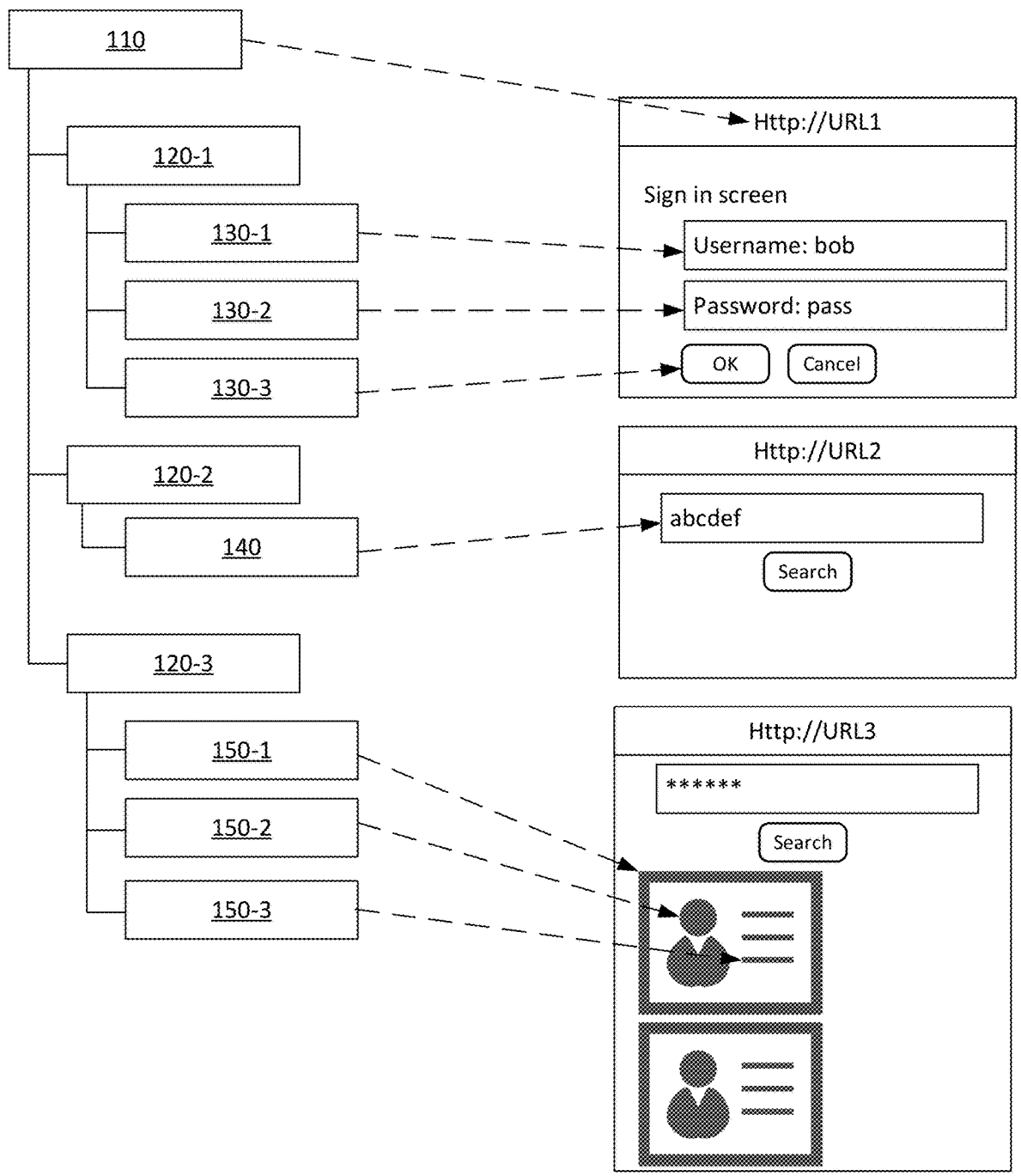
FIG. 1 illustrates a graphical user interface ("GUI") presenting an example flow of a test configuration with modular segments in accordance with some embodiments.

FIG. 1 illustrates a graphical user interface ("GUI") presenting an example flow 110 of a test configuration with modular segments 120-1 to 120-3 (herein sometimes collectively referred to as "segments 120" or individually as "segment 120") in accordance with some embodiments. Flow 110 may be defined with a Uniform Resource Locator ("URL"), address, or another identifier for accessing an AUT that is tested according to modular segments 120 of flow 110.

Each segment 120 may be used to test a different set of elements of the AUT. For instance, segment 120-1 may include three actions 130-1 to 130-3 for testing a first set of three elements that are accessible at the URL, address, or identifier specified for flow 110, segment 120-2 may include one action 140 for testing one element that is accessible at a second URL associated with the AUT, and segment 120-3 may include three actions 150-1 to 150-3 for testing different parts of an element that is accessible at the second URL after executing the action of segment 120-2.

Each action may test a corresponding element by interacting with the element (e.g., selecting, clicking, moving, modifying, etc.), providing input to the element, executing an operation or command in associated with the element, recording output of the element, and/or comparing the output of the element to an expected value. For instance, step 120-1 may access a first GUI presented by the AUT at a first URL, action 130-1 may provide input "bob" into a first input field of the first GUI, action 130-2 may provide input "pass" into a second input field of the first GUI, and action 130-3 may select or click a button that is presented on the first GUI in order to advance the AUT to a second GUI at a second URL for testing via action 140 of step 120-2.

Each set of elements may correspond to a different functionality, service, website, website component (e.g., object, frame, fragment, field, tag, etc.), content, one or more API calls, hardware (e.g., individual actuators of a robot, or different network radios of a User Equipment ("UE")), and/or other software of the AUT. Therefore, segments 120 may be defined with actions for testing different elements accessible at the same URL, different interactions with the same element, and/or elements that stem from actions of a previous segment 120. For instance, the element tested by segment 120-2 may become accessible in response to executing the actions defined for segment 120-1, a change in the Document Object Model ("DOM") of the AUT resulting from executing the actions defined for segment 120-1, or other change resulting from executing the actions of segment 120-1.

A GUI may be provided to modularly build flow 110 with segments 120-1, 120-2, and 120-3 with the corresponding actions, and to also modularly modify the segments without having to manually write test code or recreate flow 110 anew when changing one or more segments. In some embodiments, a test configuration and the corresponding flow may be modularly built from one or more segments that are automatically generated (e.g., via recorded user interactions) and/or reused from other test configurations or a test configuration repository. More specifically, embodiments of the platform described herein may allow a user to modularly build a test configuration and the corresponding flow by using graphical elements in the GUI to modify, add, remove, or replace any segment or action of the flow without having to rerecord or rebuild the test configuration, without writing computer code for any segment, and/or without impacting other parts of the test configuration for testing unchanged parts of an AUT. As described in FIG. 2, segment 120-1 may be modified by recording GUI interactions, other segments may be defined or modified by dragging and dropping or otherwise interacting with graphical elements corresponding to those segments, and one or more actions of the segments may be customized via GUI interactions with graphical elements representing the corresponding actions.

Figure 2:
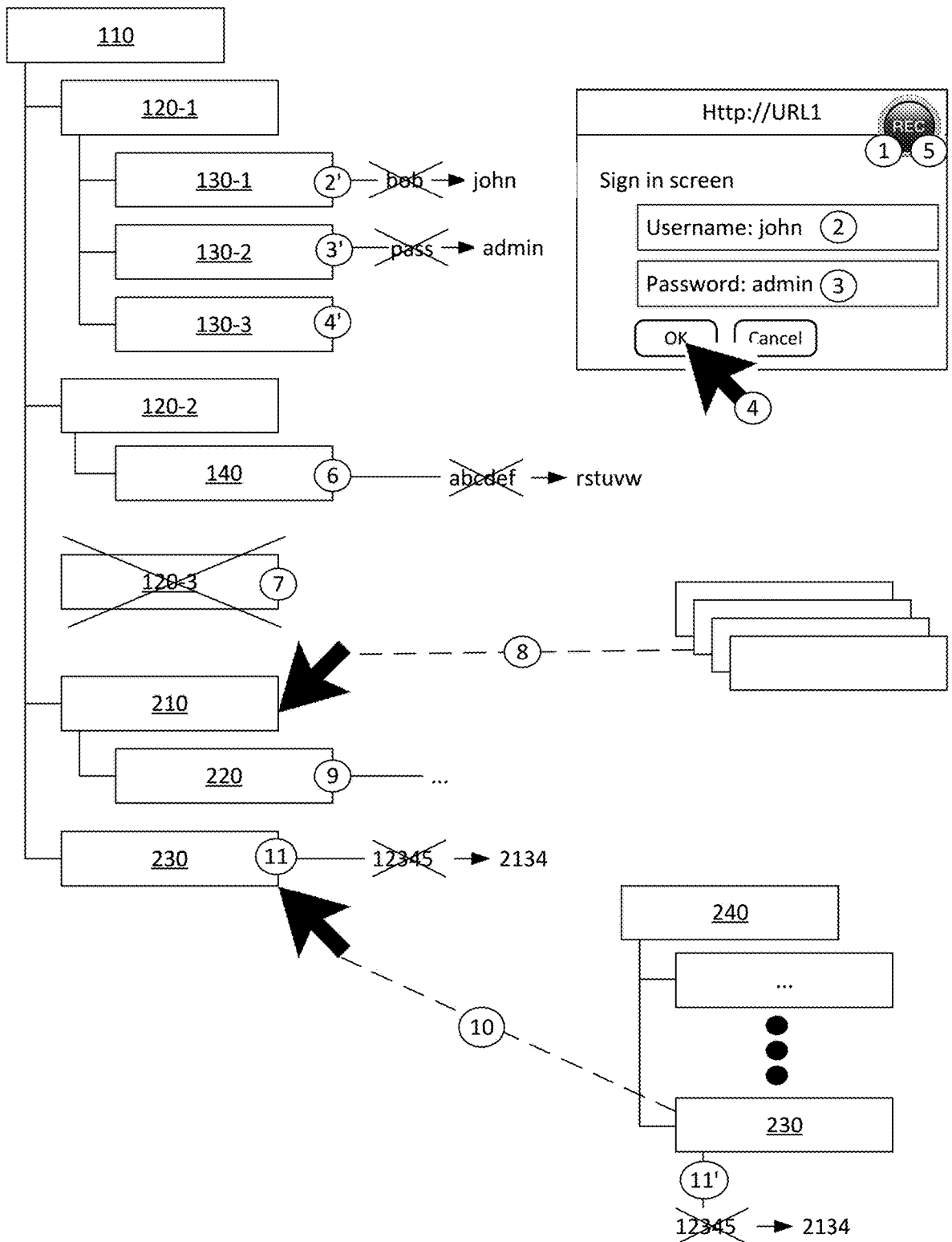
FIG. 2 illustrates a GUI for modularly modifying a flow according to an implementation described herein.

FIG. 2 illustrates a GUI for modularly modifying flow 110 according to an implementation described herein. As shown in FIG. 2, segment 120-1 may be modified, separate from other segments of flow 110, to change the input that is provided by actions 130-1 and 130-2. The modular modification to segment 120-1 may be in response to selection (at 1) of a recording button, icon, or other control that is present on the GUI, a browser, or other application used to access the AUT at the first URL. The recording option may be provided by a plug-in of the GUI, browser, or other application, or by embedding and executing a script into the AUT or a site that is accessed prior to the AUT.

The selection (at 1) may commence recording (at 2, 3, and 4) of GUI interactions with a first set of elements of the AUT that are accessible at the first URL, and mapping (at 2', 3', and 4') the user interactions to actions 130 for testing the first set of elements. The interactions may include entry (at 2) of a username in a first element (e.g., a first input field) of the first set of elements, entry (at 3) of a password in a second element (e.g., a second input field) of the first set of elements, and a click (at 4) or other interaction with a third element (e.g., a button) of the first set of elements. The plug-in or script may automatically identify the identifier for referencing the first element, capture the input or interaction, and update (at 2') action 130-1 to reproduce the input or interaction on the first element using the identifier. The plug-in or script may similarly identify the identifiers for the second and third elements, capture the inputs or interactions with the second and third elements, and update (at 3' and 4') actions 130-2 and 130-3 accordingly. A subsequent selection (at 5) of the recording button icon, or other control stops the modular modification of flow 110, and specifically, segment 120-1.

FIG. 2 also illustrates modular modification of segment 120-2 by directly accessing action 140 of segment 120-2, and modifying (at 6) the value or input associated with action 140. A user may interact with a graphical representation of flow 110 to modify (at 6) the value or input associated with action 140. In particular, the user may select a GUI element corresponding to action 140, before entering the value or input. The user may update action 140 without writing or changing code, determining the identifier for the element referenced by action 140, or specifying the instructions or commands for providing the changed value or input to the element referenced by action 140. As will be described below, the code may be automatically generated by mapping action 140 to one or more commands or instructions of a test framework (e.g., Selenium), with the generated code referencing one or more AUT elements using one or more identifiers that are specified as part of action 140.

Another modular modification to flow 110 may include removal (at 7) of segment 120-3. For instance, segment 120-3 may be used to test one or more elements that are removed from the AUT. Rather than rewrite test code or rerecord the test configuration because of the one or more removed elements, the modular structure of flow 110 allows for the simple removal of segment 120-3, which also removes the one or more actions associated with segment 120-3, to accommodate the removal of the one or more elements removed from AUT. Segment 120-3 may be removed by selecting the GUI element corresponding to segment 120-3 in flow 110, and then deleting segment 120-3.

A segment that is defined once as part of a test configuration or that is entered into a test configuration repository may be reused in creating new or different test configurations for the same or different AUTs. For instance, another modular modification to flow 110 may include adding (at 8) segment 210, from a test configuration repository, to a desired point of execution within flow 110. Segment 210 may be added by dragging and dropping a GUI element corresponding to segment 210 from the test configuration repository under segment 120-2. A user may then customize action 220 associated with segment 210 by selecting the GUI element corresponding to action 220, and by providing (at 9) one or more values for input, an interaction, and/or expected output associated with action 220. The expected output may be used as a verification parameter to check against output provided by the AUT when action 220 is executed during testing of the AUT with modified flow 110.

Similarly, flow 110 may be modularly modified (at 10) to include or reuse segment 230 from another flow 240. For instance, a user may drag and drop a GUI element corresponding to segment 230 from flow 240 to flow 110. In some embodiments, a modification that is made to segment 230 or one or more associated action in one flow may be automatically carried over and used to update other flows with segment 230. For instance, a modification (at 11) to the value of a command associated with segment 230 of flow 110 is automatically carried over and used to change (at 11') the value of the command associated with segment 230 in flow 240. In some embodiments, segment 230 may be dragged and dropped from flow 240 to flow 110 without the values for segment 230 being carried over or linked.

These and other modifications may easily adapt flow 110 to test new, different, or changed elements of the AUT. In particular, the modular modifications (e.g., any of segments 1-11 of FIG. 2) may be made without specifying the identifiers for referencing each of the elements, without writing code for interacting with the elements, without rerecording flow 110 anew, and/or without impacting other unmodified segments of flow 110. The modular selection and combination of segments from other flows or the test configuration repository enables rapid and error free construction or updating of flow 110. Moreover, the modular reuse of segments eliminates the need for recording or coding each segment, as well as having to separately update each and every test case that repeats or reuses a segment when modifying that segment or one or more of its corresponding actions.

The modular test automation platform may also include selecting a number and location of nodes on which a test configuration executes, and/or an execution schedule for the test configuration. In this manner, a test configuration can be modularly executed on or with specific software and/or hardware, from designated network locations, and/or other controllable test execution parameters. The selected nodes may host the AUT, or may target testing to one or more URLs, addresses, or other identifiers for accessing a remotely hosted AUT. The selected nodes may also simultaneously or contemporaneously execute a test configuration to test an AUT with a specific load.

Figure 3:
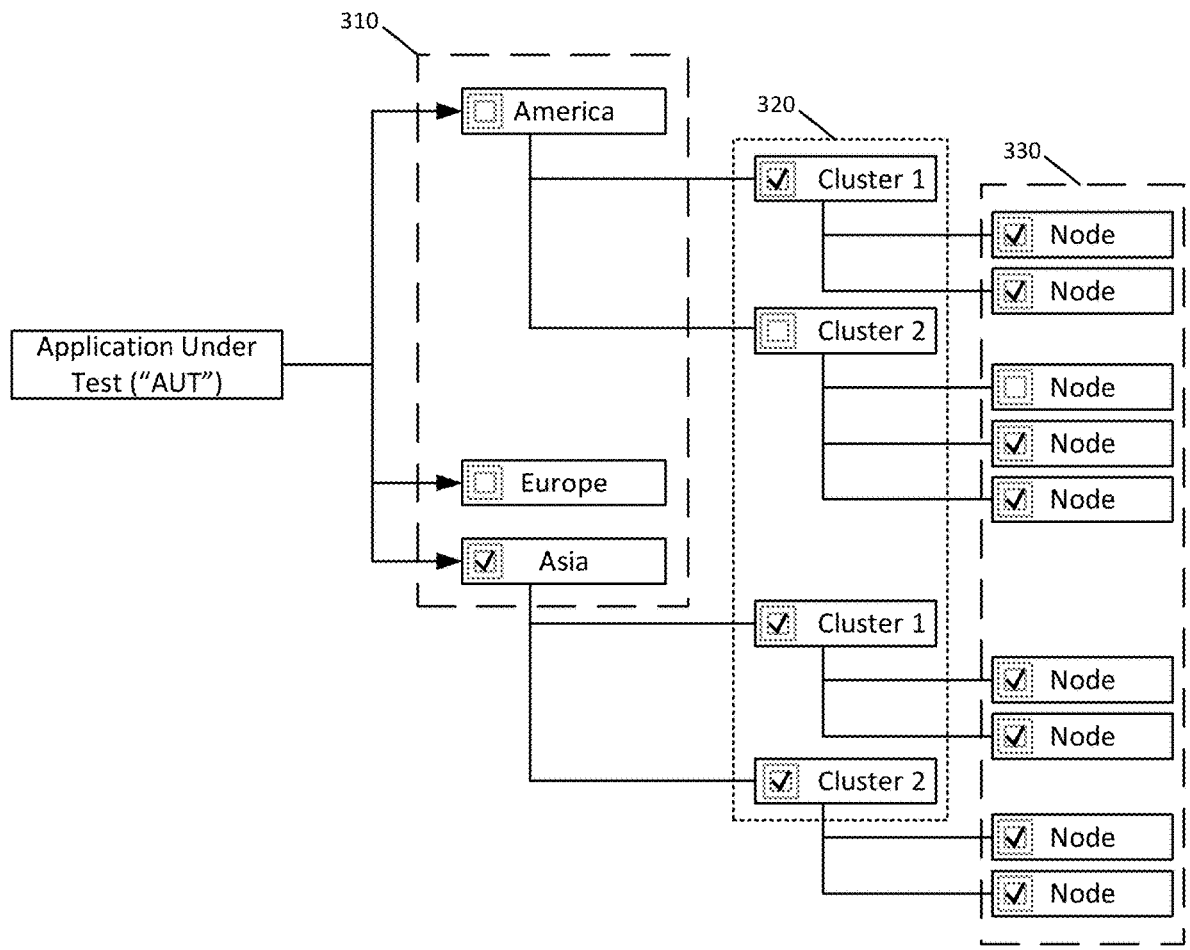
FIG. 3 illustrates a GUI for modularly configuring test execution in accordance with some embodiments described herein.

FIG. 3 illustrates a GUI for modularly configuring test execution in accordance with some embodiments described herein. The figure illustrates a tiered arrangement of graphical elements that can be selected and unselected. The graphical elements correspond to nodes that are available for testing an AUT with one or more flows.

A first-tier or top-tier 310 may group node clusters of the second-tier 320 that are accessible from the first-tier 310. Each node cluster in the second-tier 320 may represent different groupings of individual nodes of the third-tier 330. The individual nodes can be individually selected in the third-tier 330 to execute a test configuration and test an AUT. The individual nodes may also be selected in groups for test configuration execution based on selections of node clusters in the second-tier 320 or groupings of node clusters in the first-tier 310.

The grouping of nodes to each node cluster in the second-tier 320 may be based on location, resources, performance, application type, or other criteria associated with each node in the third-tier 330. For instance, nodes in a cluster may be configured with a common set of resources (e.g., software and/or hardware), or may operate from a common point-of-presence. The first-tier 310 may include node clusters with the same type of nodes, or a mix of clusters with different types of nodes. For instance, FIG. 3 illustrates the first-tier 310 as grouping node clusters based on geographic region, or location of the nodes in the node clusters.

A user may configure test execution based on a modular selection of nodes from the organization of nodes shown in FIG. 3 or other organizations. The selection may be saved with or as part of a flow or test configuration.

An execution schedule may also be specified and saved with or as part of the flow or test configuration. The execution schedule may specify one or more times or frequencies with which the selected nodes execute the test configuration. For instance, a test configuration may be scheduled to run hourly during business hours to ensure that a website is operational at different geographic regions during those times.

The GUI of FIG. 3 and the ability to modularly configure test execution allow users to quickly and easily execute customized tests using GUI interactions without having any knowledge of the testing infrastructure. For instance, a user does not need the addressing of each node that is used to execute a test configuration, or access privileges with which to individually access each node, upload the test configuration to the node, and/or define a script for scheduled execution of the test configuration by that node.

Figure 4:
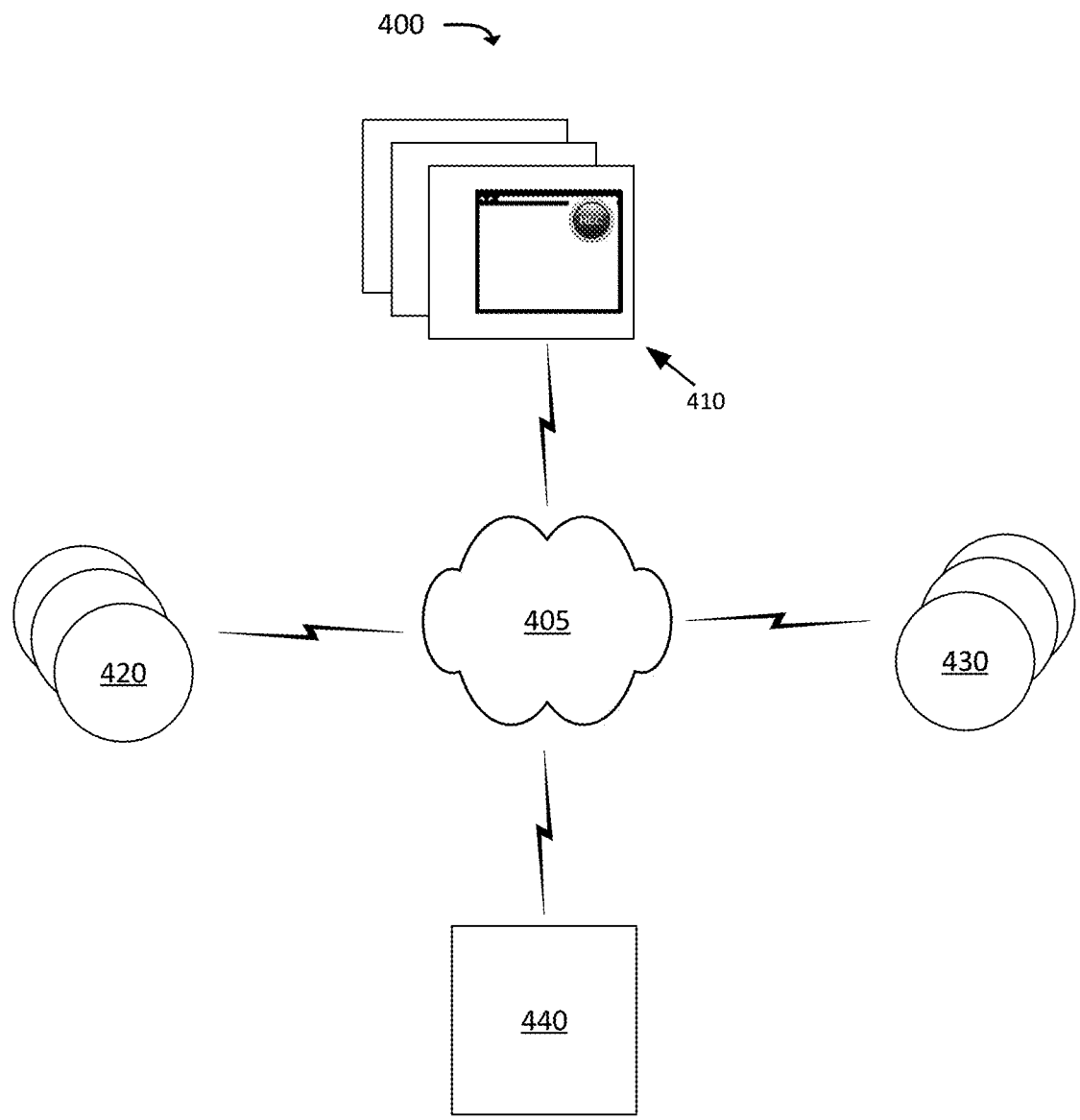
FIG. 4 illustrates an example environment, in which one or more embodiments, described herein, may be implemented.

FIG. 4 illustrates an example environment 400, in which one or more embodiments, described herein, may be implemented. As shown in FIG. 4, environment 400 may include network 405, UEs 410, AUTs 420, nodes 430, and test platform 440. The quantity of devices and/or networks, illustrated in FIG. 4, is provided for explanatory purposes only. In practice, environment 400 may include additional devices and/or networks; fewer devices and/or networks; different devices and/or networks; or differently arranged devices and/or networks than illustrated in FIG. 4. For example, while not shown, environment 400 may include devices that facilitate or enable communication between various components shown in environment 400, such as routers, network switches, gateways, etc. Alternatively, or additionally, one or more of the devices of environment 400 may perform one or more functions described as being performed by another one or more of the devices of environments 400. For instance, nodes 430 may execute the test configurations that are used to test AUTs 420, and may also host the AUTs 420. Devices of environment 400 may interconnect with each other and/or other systems or devices via wired connections, wireless connections, or a combination of wired and wireless connections. In some implementations, one or more devices of environment 400 may be physically integrated in, and/or may be physically attached to, one or more other devices of environment 400.

Network 405 may include one or more of a Local Area Network ("LAN"), a wireless telecommunications network, an IP-based Packet Data Network ("PDN"), a Wide Area Network ("WAN") such as the Internet, a private enterprise network, and/or one or more other networks. In some implementations, network 405 may be, or include, a cellular network, such as a Third Generation ("3G") network, a Fourth Generation ("4G") network, a Long-Term Evolution ("LTE") network, a Fifth Generation ("5G") network, etc. Network 405 may include, and/or may be connected to, one or more other networks, such as a public switched telephone network ("PSTN"), a Public Land Mobile Network ("PLMN"), and/or another network.

UEs 410 may each include any computation and communication device that is capable of communicating with one or more networks (e.g., network 405). For example, UEs 410 may include a device that can access voice or calling services provided by network 405, and/or receive content, such as web pages (e.g., that include text content and/or image content), streaming audio and/or video content, and/or other content, via an Internet connection, data services provided by network 405, and/or via some other delivery technique. In some implementations, UEs 410 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a vehicle (e.g., automobile), an Over-The-Top ("OTT") streaming device, sensor, robot, Internet-of-Things ("IoT") device, a television, a personal gaming system, a wearable device, and/or another type of computation and communication device.

Users may operate UEs 410 to modularly construct test configurations, and/or modularly configure execution of their test configurations on nodes 430. For instance, UEs 410 may modularly construct test configurations by accessing one or more AUTs 420, via network 405, and by using a browser or other application to record user interactions with the accessed AUTs 420, and/or map the interactions to test configuration segments and actions. In some embodiments, the browser may execute a plug-in that incorporates the recording and/or mapping functionality. UEs may also access test platform 440, via network 405, to modularly modify or build test configurations, and/or modularly select nodes for test configuration execution.

AUTs 420 may represent one or more devices, or sets of devices, that host or implement different functionalities, services, websites, pages, content, APIs, hardware, and/or other software under test. AUTs 420 may be accessed via network 405 using one or more URLs, addresses (e.g., Internet Protocol ("IP") addresses), or other identifiers. Messages for testing AUTs 420 and obtaining test results may use HyperText Transfer Protocol ("HTTP"), HTTP Secure ("HTTPS"), and/or other messaging or communication protocols. AUTs 420 may also support Representational State Transfer ("REST") models of network communication. AUTs 420 may be hosted on the same or different devices that run nodes 430.

Nodes 430 may represent one or more devices, or sets of devices, that execute test configurations for testing AUTs 420. Nodes 430 may be dedicated or shared test devices that are distributed across different geographic regions. Nodes 430 may operate using the same or different set of resources (e.g., software and/or hardware). Nodes 430 may also include devices that perform non-test related tasks. For example, nodes 430 may include devices that host applications, services, APIs, or other software and/or hardware for internal business systems or for external customers. In other words, nodes 430 may be devices within a production environment of a business (e.g., devices performing day-to-day business tasks) that may also be used to test changes or upgrades to software and/or hardware before the changes or upgrades are made internally or externally accessible via the production environment.

Test platform 440 may be a centralized or distributed system of one or more devices for modular test automation. Test platform 440 may include a repository for storing test configurations, and a defined set of segments that may be used to modularly build new test configurations or modify existing test configurations. In some embodiments, test platform 440 may provide one or more interactive interfaces that UEs 410 may access to modularly build or modify test configurations.

Figure 5:
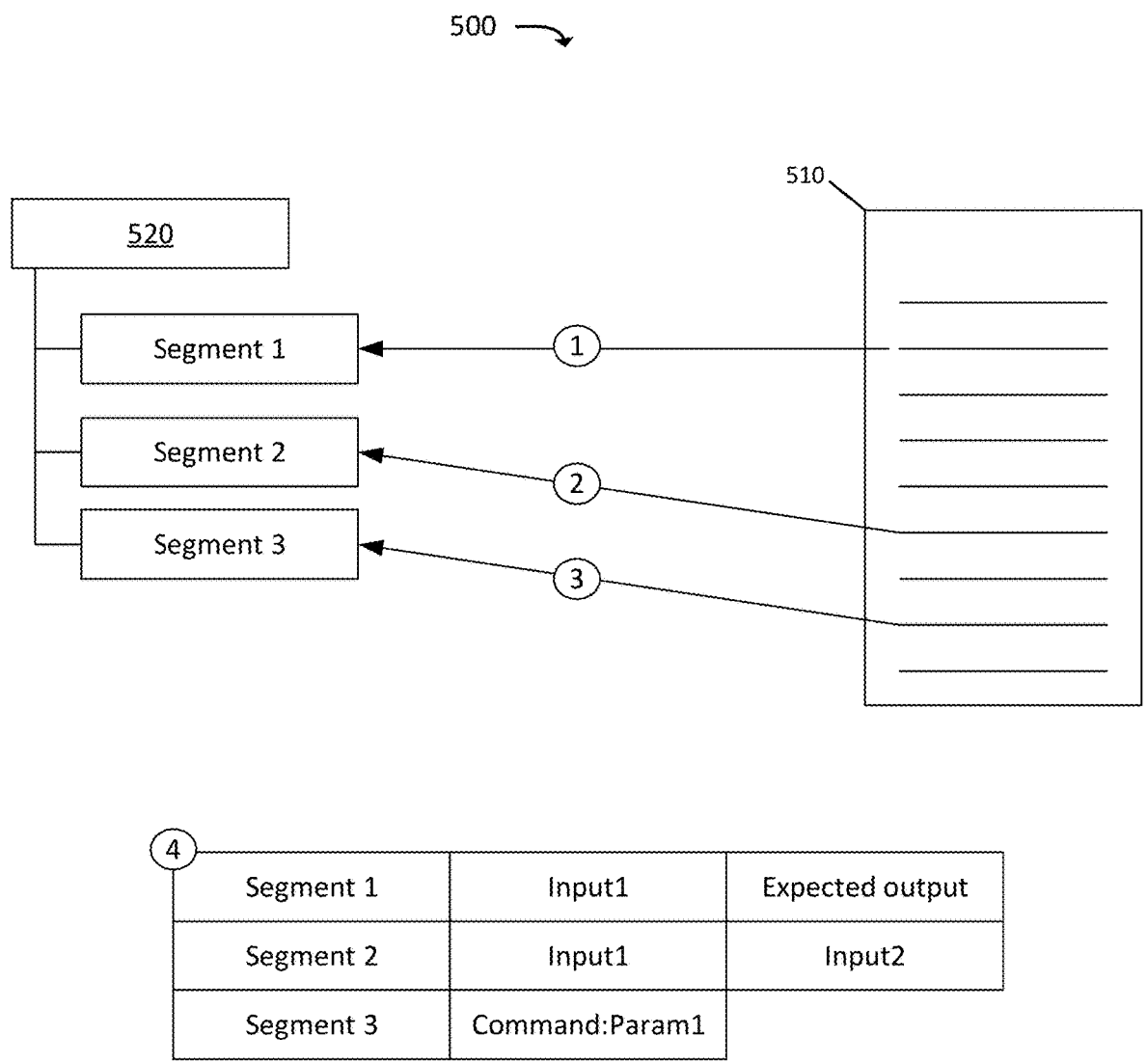
FIG. 5 illustrates an example interface for modularly creating or modifying a test configuration in accordance with some implementations described herein.

FIG. 5 illustrates an example interface 500 (e.g., a GUI) for modularly creating or modifying a test configuration in accordance with some implementations described herein. UEs 410 may access interface 500 by directing a browser or other application to a URL, address, or other identifier associated with test platform 440, and/or by executing a standalone application that presents interface 500. Interface 500 may provide segments 510 that have been defined as part of other test configurations or that are stored in the test platform repository. Keyboard, mouse, touch, vocal, or other input means may be used to select one or more of segments 510, and add (at 1, 2, and 3) the selected segments in a particular ordering to specify flow 520 of the test configuration.

Each segment may be associated with one or more elements of AUT 420. An AUT element may include any programmatically accessible or programmatically interactive object or component of AUT 420. Elements may include HyperText Markup Language ("HTML") objects, JavaScript objects, objects that can be called via a function or API call, or any object that can be referenced via one or more tags, addresses, or other identifiers.

Each segment may be customized (at 4) once it has been added to a flow. For instance, each segment may be associated with one or more actions, input, expected output, and/or other parameters that can be customized. The actions and/or input replicate user interactions with AUT 420 to validate AUT 420 operation. For instance, execution of a test configuration may determine that AUT 420 is operating properly when all actions from the test configuration are performed on corresponding AUT 420 elements and when all input fields are present for entering input specified as part of the test configuration. If, however, a change is made to AUT 420 or AUT 420 is not functioning properly, one or more of the actions may not execute, and/or of the input fields may be inaccessible. Test platform 440 may detect and log these errors. The expected output may similarly be used to validate AUT 420 operation. The expected output may be compared against actual output produced by AUT 420. If the expected output and actual output are mismatched, then test platform 440 may detect and log the mismatched output as an error. The expected output can be a specific value, a range of values, or a condition. For instance, segment 1 in FIG. 5 may be defined with a first action that provides input to a first element of AUT 420, and that verifies whether AUT 420 provides actual output that matches expected output in response to providing the input. Similarly, segment 3 in FIG. 5 for executing a command using a particular parameter on a second element of AUT 420 may be completed if AUT 420 is operating properly and the second element becomes accessible based on first and second inputs provided to a different element of AUT 420 by segment 2.

Interface 500 may also allow for creation of new segments. A user may select any position in flow 520 at which to create a new segment. The user may then customize the segment by defining actions, input, expected output, and/or other parameters, and/or by linking the actions, input, expected output, and/or other parameters to one or more objects of AUT 420.

Test platform 440 may also modularly build test configurations based on recorded user interactions with AUT 420. In some embodiments, test platform 440 may provide a recording tool for recording the user interactions. The recording tool may execute locally on UEs 410, or may be remotely accessed by UEs 410 via test platform 440. In some embodiments, the recording tool may be plug-in or other application for recording user interactions with AUT 420.

Figure 6:
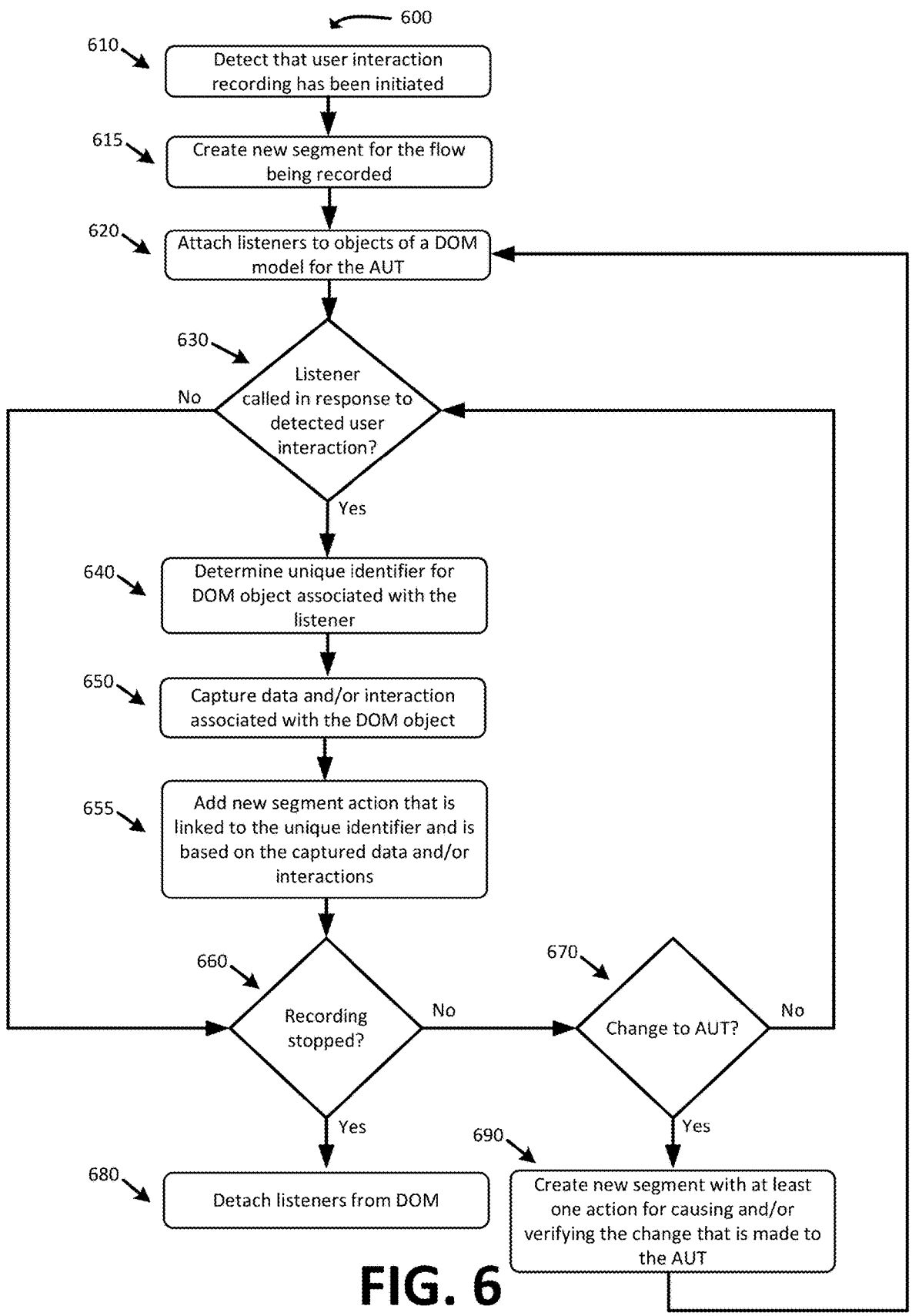
FIG. 6 presents an example process for modular generation of a test configuration based on user interactions according to an implementation described herein.

FIG. 6 presents an example process 600 for modular generation of a test configuration based on user interactions according to an implementation described herein. Process 600 may be performed by test platform 440 in conjunction with the recording tool recording user interactions with AUT 420.

Process 600 may include detecting (at 610) that user interaction recording has been initiated on UE 410 for AUT 420 being accessed by UE 410. For instance, a browser or other application executing on UE 410 may navigate to a URL, address, or other identifier associated with AUT 420, access a website, page, content, API, or other data of AUT 420, and a user may select a control (e.g., click a button) on the browser or other application to commence recording.

To record user interactions with AUT 420, process 600 may include creating (at 615) a new segment for the flow or test configuration, and attaching (at 620) listeners to a Document Object Model ("DOM") model of AUT 420. More specifically, the browser or other application accessing the AUT may construct a tree-based representation of the AUT elements that are accessible at the URL, address, or other identifier. Each AUT element may correspond to a different DOM object that can be programmatically accessed by the recording tool. The recording tool may attach (at 620) a listener to each DOM object. For instance, the recording tool may use the JavaScript EventListener( ) method to attach (at 620) an event handler to each DOM object. The listener may detect when input is provided to and/or output is provided by the DOM object or the corresponding AUT element, and/or when an event (e.g., "onclick", "mousemove", "onchange", "onload", "onmousedown", "onmouseup", or other interactions) associated with the DOM object or the corresponding AUT element occurs.

User interactions that are detected via the attached listeners may be modularly added to the segment as different actions. Accordingly, process 600 may include determining (at 630) if one of the attached listeners is called as a result of a user interaction with one or more of the AUT elements corresponding to the DOM objects with the attached listeners.

In response to determining (at 630—No) that none of the attached listeners are called (e.g., no detected user interaction) after some amount of time, process 600 may include determining (at 660) if the user interaction recording has been stopped. In some embodiments, the recording may be stopped based on a user selection that deactivates the recording, a user closing AUT 420, a user closing the browser or application used to access AUT 420, or other user action. In some embodiments, the recording may be stopped based on a system generated event (e.g., a flow reaching a certain length or duration).

In response to determining (at 660—No) that user interaction recording has not been stopped, process 600 may include detecting (at 670) whether a change has been made to AUT 420. Detecting a change to AUT 420 may include detecting a change in the AUT URL, address, or other identifier, detecting a change in the AUT website, page, or content, and/or detecting a change to the DOM model of AUT 420. A change may be made to AUT 420 as a result of a user interaction (e.g., selecting a hyperlink, performing a login action, submitting a query or request, etc.) or dynamic content of AUT 420 (e.g., content that changes after some amount of time, changes based on the user agent of the test device, and/or changes based on previous interactions with AUT 420). A change may also be made to AUT 420 when AUT 420 provides output, makes a call to a third-party system, or a change is detected in user interactions with the current website, page, or content (e.g., user interactions are detected between different HyperText Markup Language ("HTML") frames of the same website, page, or content). In some embodiments, a user may also manually signal creation of a new segment (e.g., selecting an option or control from within the recording tool).

When no change to AUT 420 is detected (at 670—No), process 600 may continue to monitor for a detected user interaction using the previously attached set of listeners, and determine (at 630) if an attached listener is called. When a change to AUT 420 is detected (at 670—Yes), process 600 may include creating (at 690) a new segment with at least one action for causing and/or verifying the change that is made to AUT 420. For instance, a change to the DOM, URL, or other aspect of AUT 420 may be detected, and the new segment is created based on the detected change. The new segment may include a first action (e.g., selecting a hyperlink, changing the URL, selecting a button, executing a function call, etc.) to transition AUT 420 from a first URL to a second URL, and/or a second action that specifies expected output to verify that AUT 420 transitioned from the first URL to the second URL. Subsequent user interactions with elements provided in response to the change in AUT 420 may be recorded as actions under the newly created (at 690) segment. To record user interactions with the elements provided by the change in AUT 420, process 600 may include attaching (at 620) listeners to the modified DOM, that represents the changes to AUT 420, and determining (at 630) if an attached listener is called.

In response to determining (at 630—Yes) that one of the attached listeners is called, process 600 may proceed to add one or more actions, corresponding to the detected user interactions, to the modular segment of the flow that is currently being added to. A listener that is attached (at 620) to a particular object of the DOM may be called in response to a user interaction with the particular object. Interactions can include keyboard, mouse, touch, sound (e.g., audio captured using a microphone), sight (e.g., images or gestures sensed by a camera or other sensor), and other means of accessing, providing input, or manipulating the particular object. To create an action for the current segment of the flow, process 600 may include determining (at 640) a unique identifier for the particular object of the attached listener. The unique identifier may include an HTML reference for the particular object. For instance, the unique identifier may specify a span, div, XPath, or other HTML or code segment that references the particular object. Process 600 may further include capturing (at 650) data and/or an interaction associated with the particular object, and adding (at 655) a new action for the current segment of the flow that is linked to the unique identifier and that provides input, manipulates the particular object, and/or verifies output of the particular object based on the captured (at 650) data and/or interactions. For instance, a segment may include a first action for selecting a username field, a second action for populating the username field with first data, a third action for selecting a password field, a fourth action for populating the password field with second data, and a fifth action for selecting a login action or button. These five actions of a single segment may be modularly separated from subsequent actions of a different segment in response to detecting (at 670—Yes) a change in URLs or the DOM of AUT 420, and creating (at 690) a new segment under the flow.

Once an action has been modularly added as part of a segment of the overall flow, process 600 may continue to modularly construct the flow with additional actions and/or segments, or recording may be stopped (at 660—Yes) based on selection of a stop recording option, exiting the recording application, and/or other user interactions or events. In response to detecting (at 660—Yes) that the recording has been stopped, process 600 may include detaching (at 680) the attached listeners from the DOM, thereby halting the recording and detection of user interactions with AUT 420.

In this manner, process 600 may modularly construct a flow with automatically generated and separated segments that compartmentalize different test cases for AUT 420. As noted above, the segments can correspond to different URLs, websites, pages, content, HTML frames, etc. The compartmentalized test cases as different segments may allow a user to quickly identify a specific test case for a specific part of AUT 420, and/or modify or replace that test case (e.g., segment) without affecting other test cases (e.g., segments).

A recorded test configuration may be uploaded or entered to a repository of test platform 440. Once entered to the repository, the test configuration may be available for further modification. Further modifications may be made by modularly changing, adding, and/or removing segments of the test configuration, by rerecording existing segments, or by recording new segments to include at any part of the test configuration flow. Modifications may also include selecting nodes to execute the test configuration, and/or an execution schedule. Once entered to the repository of test platform 440, the test configuration may also be available for execution by test platform 440.

Figure 7:
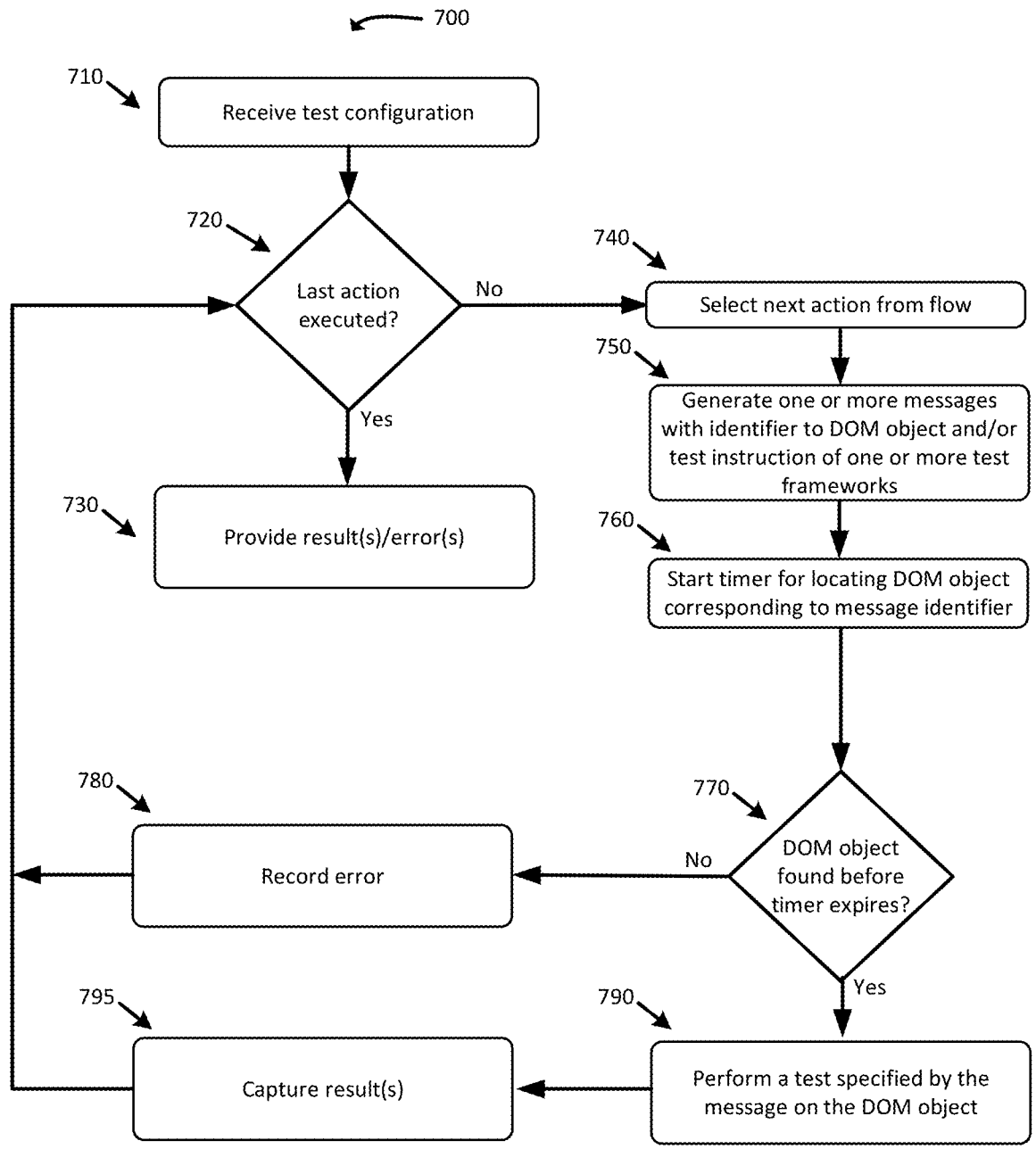
FIG. 7 presents an example process for modular execution of a test configuration according to an implementation described herein.

FIG. 7 presents an example process 700 for modular execution of a test configuration according to an implementation described herein. Process 700 may be performed by test platform 440 in conjunction with one or more nodes 430 that have been selected to execute the test configuration.

Process 700 may include receiving (at 710) the test configuration in response to scheduled execution or manual user-initiated execution of the test configuration. For instance, may access test platform 440, and select a particular test configuration to execute.

Test configuration execution may include sequentially accessing each segment defined as part of the flow for the test configuration, and executing each action specified as part of an accessed segment. Accordingly, process 700 may include determining (at 720) whether a last action specified as part of the test configuration flow has been executed.

In response to determining (at 720—No) that the last action has not yet been executed, process 700 may include selecting (at 740) a next action from the flow for execution. The next action may be selected from a currently accessed segment of the flow. When all actions of the current segment have been executed, process 700 may include selecting (at 740) a first action from a next segment of the flow.

Process 700 may include generating (at 750) one or more messages that control specific nodes 430 in testing AUT 420, and providing (at 755) the one or more messages to nodes 430 for testing of AUT 420. Test platform 440 may use one or more test frameworks to produce the messages. For instance, the one or more test frameworks may be used to map the actions of the segments from a test configuration flow into executable messages that replicate or simulate user and/or machine interactions for testing AUT 420. Selenium is an example of one such test framework for test automation. Other frameworks for test automation that may be used to generate the messages for testing AUT 420 may include JavaScript, Browsersync, Protractor, CasperJS, a RESTful API, an application specific API, etc. For example, a test configuration action for hovering over and clicking a particular AUT element may be mapped to an "action.move-ToElement(elementToHover).click(elementToClick).build( ).perform( )" Selenium action, and a test configuration action for testing an application API function may be mapped to an HTTP GET request. By separating the test configuration definition (e.g., segments and actions) from the messaging (e.g., computer instructions or code) of the underlying test framework for testing AUT 420, test platform 440 may ensure that test configurations will continue to work even when the underlying framework is changed or updated. The mapping of test configuration segments and/or actions by test platform 440 to messages of a framework may change to accommodate changes to the framework. Similarly, the segments and/or actions may be mapped to different frameworks that different nodes 430 may use to test different AUTs 420 or that support testing different features of different AUTs 420. For example, test platform 440 may map actions to messages of a first framework when testing a website or graphical interface of first AUT 420, and may map actions to messages of a second framework when testing an API of a different second AUT 420.

Figure 9:
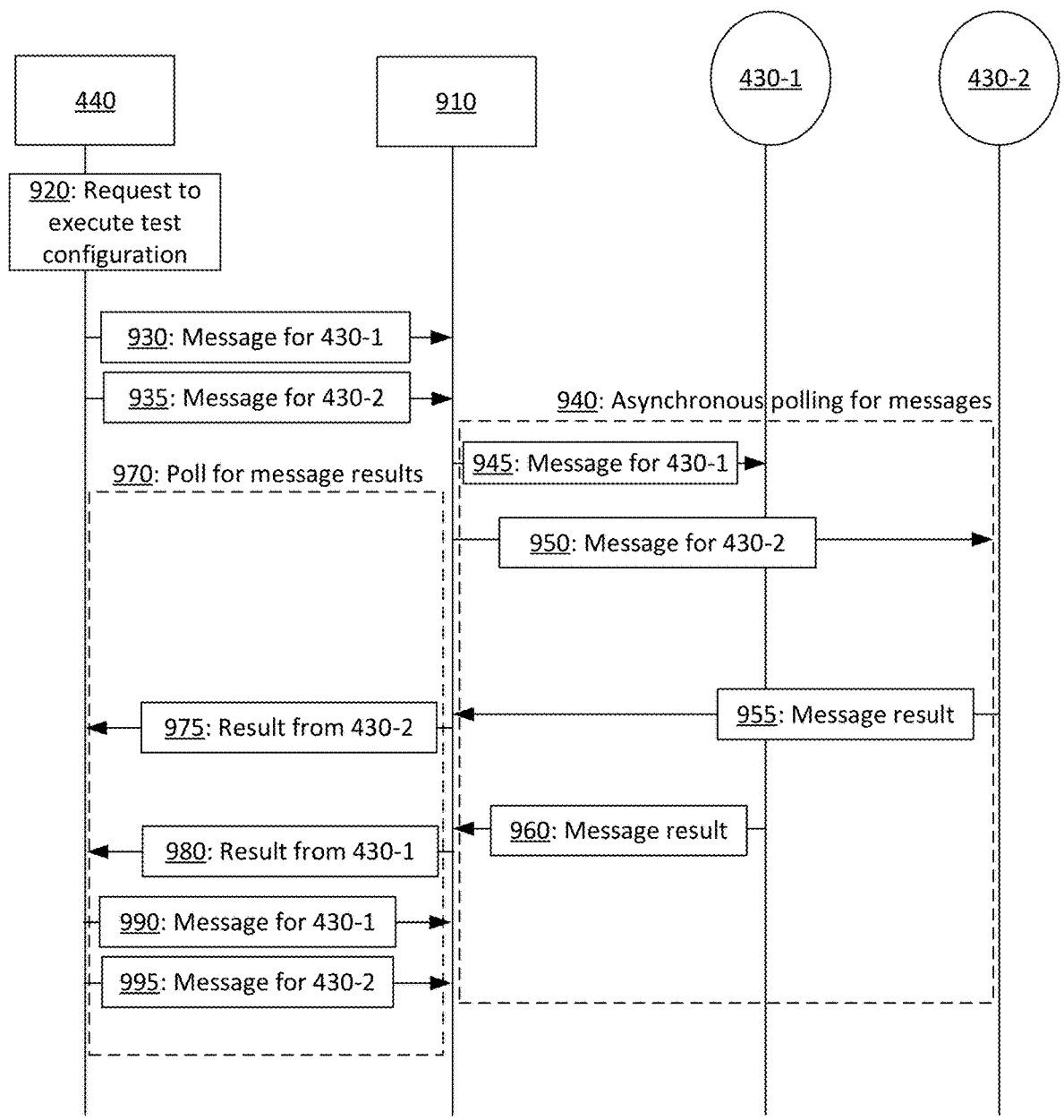
FIG. 9 illustrates a test configuration execution example based on a message broker implementation in accordance with some embodiments described herein.

The one or more generated (at 750) messages may include a unique identifier to reference a DOM object of AUT 420. As noted above, the unique identifier may be a span, div, XPath, or other HTML or code segment that references the DOM object, and may be specified as part of the selected action. The messages may also include a test instruction or command, from the test framework, for testing the DOM object. The test instruction or command may provide input to the DOM object, perform a user interaction on or in conjunction with the DOM object, provide expected output for verifying actual output provided by the DOM object or by AUT 420 in response to a user interaction with the DOM object, and/or perform any other test of or in associated with the DOM object. Each of the one or more messages may be addressed to a different node 430 that has been selected to test AUT 420. For example, test platform 440 may generate (at 750), via Selenium (e.g., a particular test framework), first and second messages that include one or more Selenium supported function calls, commands, or other instructions for execution by first and second nodes 430 respectively, and first and second nodes 430 may be configured with a Selenium driver, API, or other execution module. The messages may be pulled from test platform 440 by nodes 430, and/or may be pushed from test platform 440 to nodes 430 for execution. FIG. 9 below illustrates an example of using a message broker to provide the one or more test framework messages from test platform 440 to nodes 430 for execution.

The messages may then be executed by nodes 430 in order to test some part of the AUT. To do so, process 700 may include starting (at 760) a timer for locating the DOM object corresponding to the unique identifier specified in the message. The timer may be used to prevent an endless loop when the DOM object being tested does not exist because of a misconfiguration of the test configuration action, a change to AUT 420, an outage that prevents nodes 430 from accessing AUT 420, and/or other failure or misconfiguration. For instance, a node 430 may retry locating the DOM object in order to execute the message every half second for ten seconds before the timer expires and the test associated with the message fails.

In response to the timer expiring (at 770—No) before locating the DOM object, process 700 may include recording (at 780) an error. The error may be an indication that the DOM object or a corresponding part of the AUT has changed or is functioning differently than before, AUT 420 cannot be accessed, and/or the test configuration action is misconfigured. In some embodiments, recording the error may include obtaining a screenshot of AUT 420 at the time of the error, capturing a packet, data, or status codes returned from AUT 420 (e.g., an HTTP RESPONSE message provided in response to an HTTP GET request message), logging the instruction, command, or action that failed, and/or capturing other output of AUT 420. Accordingly, test platform 440 may support testing of application User Interfaces (UIs), via screenshot captures, as well as application APIs, via packet, data, or status code recording.

Process 700 may continue the test configuration execution despite encountering one or more errors, in which case, process 700 may include determining (at 720) whether additional actions from the test configuration flow are pending execution. Some errors may cause the test configuration execution to stop at the current action of the test configuration in which case process 700 may halt test configuration execution and provide (at 730) any captured results and/or errors to test platform 440.

In response to locating (at 770—Yes) the DOM object before the timer expires, process 700 may include performing (at 790) a test specified by the message on the DOM object, and capturing (at 795) a result of the test. The test may include providing input to the DOM object, execution an instruction or command on the DOM object, verifying output produced by the DOM object or AUT 420 in response to testing the DOM object, and/or testing/simulating any other user interaction with the DOM object. In some embodiments, capturing the result of the test may include obtaining a screenshot of a UI from AUT 420 after the test associated with the message is complete, capturing a packet, data, or status codes returned from AUT 420, logging the instruction, command, or action that was executed, and/or capturing other output of AUT 420. Process 700 may then include determining (at 720) if additional actions from the test configuration flow are pending execution.

In response to determining (at 720—Yes) that a last action from the test configuration flow has been executed, process 700 may include providing (at 730) the results and/or errors from the test configuration execution to test platform 440. Test platform 440 may aggregate the results and/or errors from different nodes 430 executing the same test configuration at or near the same time. Test platform 440 may then create a holistic account of the test configuration execution from the aggregated set of results and/or errors. Test platform 440 may present the aggregated results and/or errors to a user who initiated the test, or notify one or more users that the test configuration execution is complete and results and/or errors are available for viewing.

Figure 8:
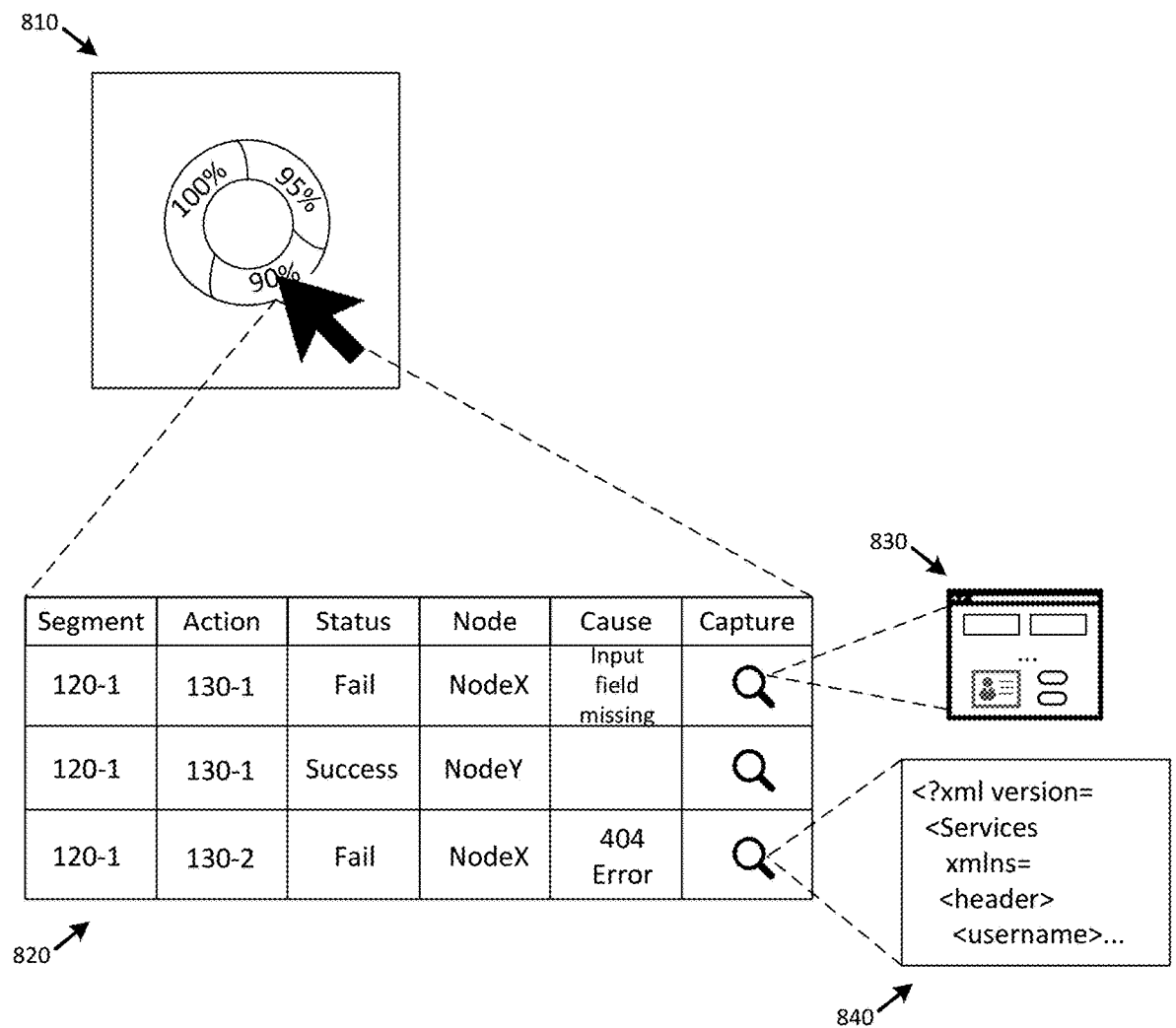
FIG. 8 illustrates a GUI for presenting test configuration execution errors and/or results according to an implementation described herein.

FIG. 8 illustrates a GUI for presenting test configuration execution errors and/or results according to an implementation described herein. As shown in FIG. 8, the results may be presented in a drill-down fashion with a first interface 810 from which different second interfaces 820 may be accessed. For instance, first interface 810 may identify one or more values for summarizing test configuration execution. The one or more values may be based on the aggregated results and/or errors provided (at 730) from execution of the test configuration, and that represent successful or unsuccessful execution of the test configuration. The one or more values may be percentages for successful or unsuccessful execution of different segments of a test configuration flow, by different nodes 430, at different execution times, and/or other groupings of the results and/or errors. Selection of any one value may then present second interface 820 that provides more detailed information about the test configuration execution.

For instance, second interface 820 may identify different segments, actions executed under each segment, status of the action execution (e.g., successful or unsuccessful), identification of one or more nodes 430 that executed the action, a cause for the error, and/or a captured result or error associated with the action execution. For instance, the captured result or error may include captured screenshot 830, captured packet contents 840, captured data or status codes, or other output provided by the AUT.

Users may troubleshoot a test configuration based on the provided results and/or errors. For example, users may identify regional issues when errors occur on nodes 430 operating from a first region, but not on nodes 430 operating in other regions. As another example, user may identify specific segments and/or actions of the test configuration, and corresponding parts of AUT 420 where errors occurred. The captures may specifically identify the errors that occur during testing without a user having to be present as the error occur or while the test configuration executes.

In some embodiments, test platform 440 uses a message broker implementation to distribute test messages, that are generated from action of a test configuration flow, to nodes 430 that have been selected to test AUT 420 using the generated messages. FIG. 9 illustrates a test configuration execution example based on a message broker implementation in accordance with some embodiments described herein.

FIG. 9 illustrates test platform 440, message broker 910, first node 430-1, and second node 430-2. In some embodiments, message broker 910 may be a device that operates separate or remote from test platform 440. In some other embodiments, message broker 910 may be integrated as part of test platform 440.

Test platform 440 may receive (at 920) a request to test AUT 420 with a test configuration. Test platform 440 may receive the request from UE 410, or based on a schedule that is configured for executing the test configuration. The request may specify testing AUT 420 with first node 430-1 and second node 430-2. In some embodiments, first node 430-1 and second node 430-2 may each run an instance of AUT 420 with software and/or hardware of the corresponding node, and may test the instance of AUT 420 running on the corresponding node. In some other embodiments, AUT 420 runs on a separate device from first node 430-1 and second node 430-2, and first node 430-1 and second node 430-2 may be selected to test AUT 420 simultaneously or at different times from the two separate devices on which first node 430-1 and second node 430-2 run.

Test platform 440 may generate messages for a first action of the test configuration flow for execution by node 430-1 and 430-2 according to one or more test frameworks supported by nodes 430, and may enter (at 930 and 935) the messages to message broker 910. Message broker 910 may queue the messages for distribution to nodes 430-1 and 430-2.

Nodes 430-1 and 430-2 may asynchronously and/or continuously poll (at 940) message broker 910 for messages pending execution by the respective node. In some embodiments, nodes 430-1 and 430-2 may be configured with an address of message broker 910, and may poll message broker 910 at a specified interval or schedule. In some other embodiments, message broker 910 may notify nodes 430-1 and 430-2 when there are messages pending execution by nodes 430-1 and 430-2. In response to the notification provided message broker 910, nodes 430-1 and 430-2 may begin polling message broker 910 for messages, and may stop polling after some period of time in which there are no new message for nodes 430-1 and 430-2 to execute.

Message broker 910 may provide (at 945) a first message to node 430-1 in response to polling by node 430-1, and may provide (at 950) a second message to node 430-2 in response to polling by node 430-2. Nodes 430-1 and 430-2 may execute the messages upon receipt. Executing the messages may include accessing AUT 420, and interacting with and/or testing an element of AUT 420 in a manner defined by the executed messages.

Each node 430-1 and 430-2 may provide (at 955 and 960) a message execution result to message broker 910 upon successfully or unsuccessfully executing the message obtained from message broker 910. Successful execution of a message may include identifying the element implicated by the message, and/or completing an interaction with (e.g., providing input to the element, clicking a button, changing a parameter, etc.) the element. Successful execution may further include verifying and/or capturing output provided by the AUT in response to the message execution. Unsuccessful execution of the message may include failing to locate the element implicated by the message, failing to complete an interaction with the element, and/or obtaining invalid or unexpected output. Message broker 910 may receive and queue the results upon receipt from nodes 430-1 and 430-2.

Test platform 440 may also asynchronously and/or continuously poll (at 970) message broker 910 for message results. In some embodiments, test platform 440 may commence polling (at 970) after entering (e.g., at 930 and/or 935) a message to message broker 910. Message broker 910 may provide (at 975 and 980) results from nodes 430-1 and 430-2 to test platform 440. Test platform 440 may aggregate the results for a holistic reporting of the test configuration execution. For example, test platform 440 may generate the example interfaces of FIG. 8 based on the aggregated results. Test platform 440 may also provide the results to a user, notify the user that results are available for viewing, or wait until test configuration execution is complete before sending the results or notification to the user.

In some embodiments, test platform 440 may generate and enter (at 990 and 995) a next set of messages for executing a next action of the test configuration flow to message broker 910 upon receiving (at 975 and 980) the previous message results from message broker 910. In some other embodiments, test platform 440 may generate and enter messages for next actions to message broker 910 before receiving any previous message results, and message broker 910 may sequentially provide the messages to nodes 430-1 and 430-2 as each node 430-1 and 430-2 returns a result for a prior message.

Figure 10:
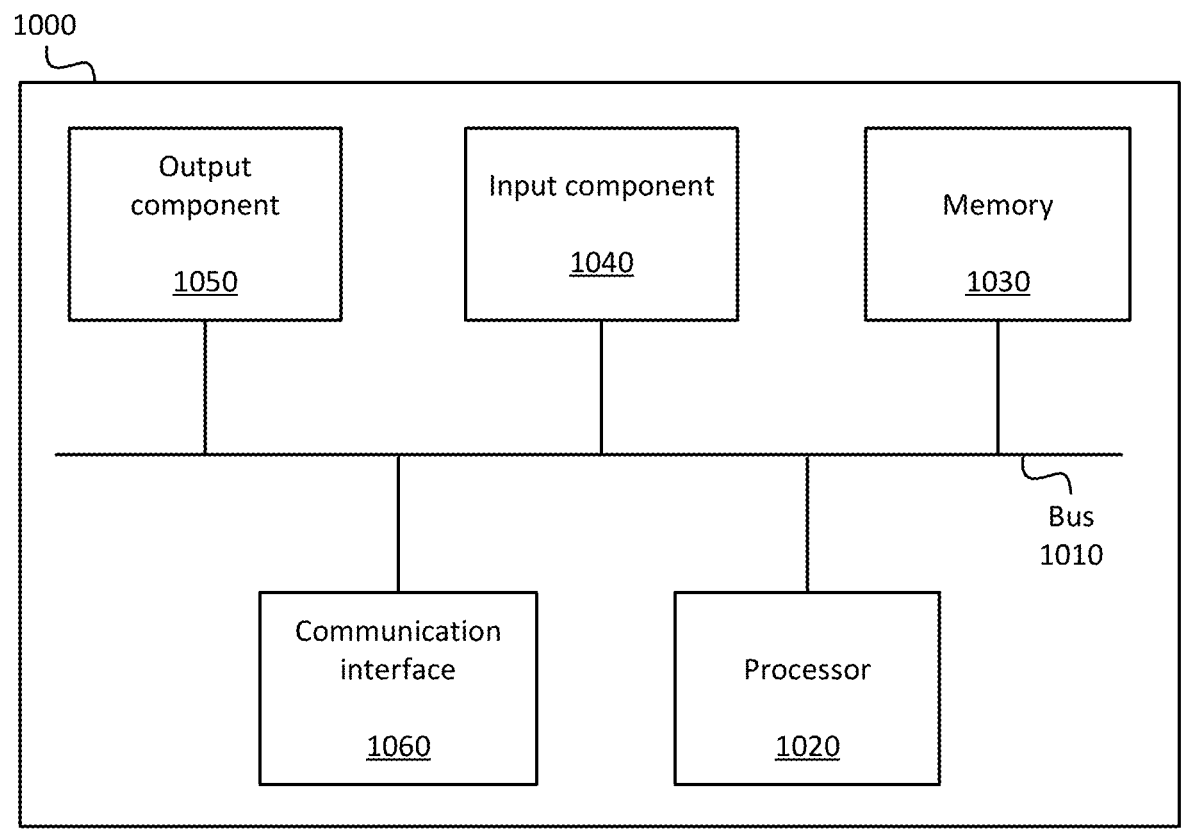
FIG. 10 illustrates example components of one or more devices, according to one or more embodiments described herein.

FIG. 10 is a diagram of example components of device 1000. Device 1000 may be used to implement certain of the devices or systems described above (e.g., AUT 420, nodes 430, and test platform 440). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIGS. 6, 7, and 9, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
   a non-transitory computer-readable medium storing a set of processor-executable instructions; and
   one or more processors configured to execute the set of processor-executable instructions, wherein executing the set of processor-executable instructions causes the one or more processors to:
   monitor a set of user interactions with an Application Under Test ("AUT");
   generate a first modular segment of a test configuration based on the monitored set of user interactions with the AUT, the first modular segment comprising a first set of actions replicating the monitored set of user interactions on a set of elements of the AUT upon execution;
   present one or more selectable elements that are each associated with a particular action of a previously generated second set of actions;
   receive one or more user interactions with the one or more selectable elements associated with the second set of actions;
   generate a second modular segment of the test configuration based on the one or more user interactions with the one or more selectable elements associated with the second set of actions, the second modular segment comprising particular actions, of the second set of actions, that are associated with the selected one or more selectable elements; and
   provide, to a set of nodes associated with a test framework, (i) a first set of messages that define the first set of actions associated with the first modular segment according to the test framework, and (ii) a second set of messages that define the second set of actions associated with the second modular segment according to the test framework, wherein providing the first set of messages causes the set of nodes to test the first set of actions, and wherein providing the second set of messages causes the set of nodes to test the second set of actions.

2. The device of claim 1, wherein the processor-executable instructions further include processor-executable instructions to:
   configure each action of the first set of actions with a unique identifier used to access a particular element from the set of elements, and a test instruction associated with the particular element, wherein the test instructions comprises one or more of providing input, manipulating, or verifying output of the particular element.

3. The device of claim 1, wherein the processor-executable instructions further include processor-executable instructions to:
   obtain a result for each action of the first set of actions from the test framework, each result capturing a screenshot or data output by the AUT in response to an executed action.

4. The device of claim 1, wherein the processor-executable instructions further include processor-executable instructions to:
   define a flow of the test configuration based on the first modular segment preceding the second modular segment; and
   reorder the flow based on repositioning the second modular segment before the first modular segment, wherein the reordering comprises processor-executable instructions to reorder execution of the second set of actions before execution of the first set of actions.

5. The device of claim 1, wherein the processor-executable instructions further include processor-executable instructions to:
   modify, without recording the first modular segment, a parameter associated with a particular action of the first set of actions, wherein the particular action is associated with a particular element of the set of elements that is modified after generating the first modular segment.

6. The device of claim 1, wherein the one or more user interactions with the one or more selectable elements are a first set of user interactions with the one or more selectable elements, wherein the processor-executable instructions further include processor-executable instructions to:
   receive a second set of user interactions with the one or more selectable elements associated with the second set of actions;
   remove the second modular segment of the test configuration based on the second set of user interactions with the one or more selectable elements associated with the second set of actions;
   generate a third modular segment based on the second set of user interactions, the third modular segment comprising a third set of actions used in testing the AUT that replace the second set of actions.

7. The device of claim 1, wherein the processor-executable instructions further include processor-executable instructions to:

update the second modular segment automatically in response to a further user interaction with the one or more selectable elements associated with the second set of actions.

8. The device of claim 1, wherein the processor-executable instructions to update include processor-executable instructions to:
modify the second modular segment after generating the first segment and adding the second modular segment based on recorded user interactions with the one or more selectable elements associated with the second set of actions.

9. A non-transitory computer-readable medium, storing a set of processor-executable instructions, which, when executed by one or more processors, cause the one or more processors to:
monitor a set of user interactions with an Application Under Test ("AUT");
generate a first modular segment of a first test configuration based on the monitored set of user interactions with the AUT, the first modular segment comprising a first set of actions replicating the monitored set of user interactions on a set of elements of the AUT upon execution;
present one or more selectable elements that are each associated with a particular action of a previously generated second set of actions;
receive one or more user interactions with the one or more selectable elements associated with the second set of actions;
generate a second modular segment of the first test configuration based on the one or more user interactions with the one or more selectable elements associated with the a second set of actions, the second modular segment comprising particular actions, of the second set of actions, that are associated with the selected one or more selectable elements; and
provide, to a test framework, (i) a first set of messages that define the first set of actions associated with the first modular segment according to the test framework, and (ii) a second set of messages that define the second set of actions associated with the second modular segment according to the test framework, wherein providing the first set of messages causes the test framework to test the first set of actions, and wherein providing the second set of messages causes the test framework to test the second set actions.

10. The non-transitory computer-readable medium of claim 9, wherein the processor-executable instructions further include processor-executable instructions to:
configure each action of the first set of actions with a unique identifier used to access a particular element from the set of elements, and a test instruction associated with the particular element, wherein the test instructions comprises one or more of providing input, manipulating, or verifying output of the particular element.

11. The non-transitory computer-readable medium of claim 9, wherein the processor-executable instructions further include processor-executable instructions to:
obtain a result for each action of the first set of actions the test framework, each result capturing a screenshot or data output by the AUT in response to an executed action.

12. The non-transitory computer-readable medium of claim 9, wherein the processor-executable instructions further include processor-executable instructions to:
define a flow of the test configuration based on the first modular segment preceding the second modular segment; and
reorder the flow based on repositioning the second modular segment before the first modular segment, wherein the reordering comprises processor-executable instructions to reorder execution of the second set of actions before execution of the first set of actions.

13. The non-transitory computer-readable medium of claim 9, wherein the processor-executable instructions further include processor-executable instructions to:
modify, without recording the first modular segment, a parameter associated with a particular action of the first set of actions, wherein the particular action is associated with a particular element of the set of elements that is modified after generating the first modular segment.

14. The non-transitory computer-readable medium of claim 9, wherein the one or more user interactions with the one or more selectable elements are a first set of user interactions with the one or more selectable elements, wherein the processor-executable instructions further include processor-executable instructions to:
receive a second set of user interactions with the one or more selectable elements associated with the second set of actions;
remove the second modular segment of the test configuration based on the second set of user interactions with the one or more selectable elements associated with the second set of actions;
generate a third modular segment based on the second test set of user interactions, the third modular segment comprising a third set of actions used in testing the AUT that replace the second set of actions.

15. The non-transitory computer-readable medium of claim 9, wherein the processor-executable instructions further include processor-executable instructions to:
update the second modular segment automatically in response to a further user interaction with the one or more selectable elements associated with the second set of actions.

16. The non-transitory computer-readable medium of claim 9, wherein the processor-executable instructions further include processor-executable instructions to:
modify the second modular segment after generating the first segment and adding the second modular segment based on recorded user interactions with the one or more selectable elements associated with the second set of actions.

17. A method comprising:
monitoring a set of user interactions with an Application Under Test ("AUT");
generating a first modular segment of a test configuration based on the monitored set of user interactions with the AUT, the first modular segment comprising a first set of actions replicating the monitored set of user interactions on a set of elements of the AUT upon execution;
presenting one or more selectable elements that are each associated with a particular action of a previously generated second set of actions;
receiving one or more user interactions with the one or more selectable elements associated with the second set of actions;
generating a second modular segment of the first test configuration based on the one or more user interactions with the one or more selectable elements associated with the second set of actions, the second modular segment comprising particular actions, of the second set of actions, that are associated with the selected one or more selectable elements;
and
providing, to a test framework for testing of the AUT, (i) a first set of messages that define the first set of actions associated with the first modular segment according to the test framework, and (ii) a second set of messages that define the second set of actions associated with the second modular segment according to the test framework, wherein providing the first set of messages causes the test framework to test the AUT based on the first set of actions, and wherein providing the second set of messages causes the test framework to test the AUT based on the second set of actions.

18. The method of claim 17, further comprising:
configuring each action of the first set of actions with a unique identifier used to access a particular element from the set of elements, and a test instruction associated with the particular element, wherein the test instructions comprises one or more of providing input, manipulating, or verifying output of the particular element.

19. The method of claim 17, further comprising:
obtaining a result for each action of the first set of actions from the set test framework, each result capturing a screenshot or data output by the AUT in response to an executed action.

20. The method of claim 17, further comprising:
defining a flow of the test configuration based on the first modular segment preceding the second modular segment; and
reordering the flow based on repositioning the second modular segment before the first modular segment, wherein the reordering comprises reordering execution of the second set of actions before execution of the first set of actions.

* * * * *